United States Patent [19]

Shyi

[11] Patent Number: 4,900,998

[45] Date of Patent: Feb. 13, 1990

[54] AUTOMATIC CAR SPEEDER SYSTEM

[76] Inventor: David Y. Shyi, 7F-1, No. 687, Chung-Shan N. Road, Sec. 5, Taipei, Taiwan

[21] Appl. No.: 217,899

[22] Filed: Jul. 12, 1988

[51] Int. Cl.[4] ........................ G05B 11/28; F22B 37/22

[52] U.S. Cl. .................................... 318/599; 318/560; 318/139; 123/361; 123/399

[58] Field of Search ........................ 318/599, 560, 139; 123/353, 357, 361, 342, 399; 261/34.1, 34.2, 34.3, 36.2, 39.5, 23.2, DIG. 39

[56] References Cited

U.S. PATENT DOCUMENTS

| | | | |
|---|---|---|---|
| 3,207,255 | 9/1965 | Hahlganss et al. | 123/353 |
| 4,313,515 | 2/1982 | Mann et al. | 123/361 X |
| 4,389,990 | 6/1983 | Murray | 123/353 |
| 4,475,503 | 10/1984 | Nakamura et al. | 123/361 X |
| 4,617,893 | 10/1986 | Donner et al. | 123/361 |
| 4,691,676 | 9/1987 | Kikuchi | 123/399 |
| 4,747,380 | 5/1988 | Ejiri et al. | 123/399 |
| 4,768,483 | 9/1988 | Asayama | 123/399 |
| 4,787,353 | 11/1988 | Ishikawa et al. | 123/399 |
| 4,821,831 | 4/1989 | Onishi | 123/361 X |
| 4,831,985 | 5/1989 | Mabee et al. | 123/361 X |

FOREIGN PATENT DOCUMENTS

| | | | |
|---|---|---|---|
| 0122742 | 7/1984 | Japan | 123/399 |

*Primary Examiner*—William M. Shoop, Jr.
*Assistant Examiner*—Paul Ip
*Attorney, Agent, or Firm*—Lowe, Price, LeBlanc, Becker & Shur

[57] ABSTRACT

An automatic car speeder system, which is to make use of a speed controller to control the action of a solenoid valve according to a signal so as to drive a DC servo motor to make a clockwise rotation or a counter rotation; to make use of a selector switch to control the car for regular speeding or automatic speeding; to make use of a servo motor to turn a pulley wheels set to drive a accelerating pump actuating rod for automatic accelerating or decelerating; to make use of the pulley wheels set connected with said DC servo motor and the accelerating pump actuating rod for reciprocal driving; and to make use of a switch of the braking system to control the action of the servo motor to let the accelerating or declerating of the car be stably controlled.

3 Claims, 3 Drawing Sheets

AUTOMATIC CAR SPEEDER SYSTEM

BACKGROUND OF THE INVENTION

Conventional car speeder system, as shown in FIG. 1. When a driver steps on the accelerator pedal (1), it turns the accelerating pump actuating rod (22) through the steel rope (11) and the crank (12) to drive the pump (2) of the carburetor or the fuel ejector for accelerating; when the foot of the driver leaves from the accelerator pedal (1), the carburetor or the fuel ejector (2) makes the car to start decelerating by means of the inertia effect of the return spring (21) on the actuating rod.

The present invention relates to an automatic car speeder system, which is to make use of a speed controller to control the action of a solenoid valve according to the signal from the current so as to drive a DC servo motor to make a clockwise rotation or a counter rotation; to make use of a selector switch to control the car for regular speeding or automatic speeding; to make use of a servo motor to turn a pulley wheels set to drive the accelerating pump actuating rod for automatic accelerating or decelerating; to make use of a pulley wheels set to connect with said DC servo motor and the accelerating pump actuating rod for reciprocal driving; to make use of a switch of the braking system to control the action of the servo motor and the action of speed control according to the signal from the current; by means of the stable rotation of said servo motor to let the accelerating or decelerating of the car be stably performed to not only reduce the consumption of oil fuel, the accumulation of carbon in car engine and the happening of engine wearing due to improper operation but also to prevent the accident resulted from the error of novice drivers to press on accelerator pedal while intending to step on brake pedal.

SUMMARY OF THE INVENTION

The present invention is to provide an automatic speeder system, which is mainly composed of a speed controller, a control switch, a DC servo motor, a pulley wheels set, and a selector switch; by means of said speed controller to control the servo motor to make a clockwise rotation or a counter rotation; by means of said selector switch to control the car for regular speeding or automatic speeding; by means of said servo motor to turn the pulley wheels set to drive the accelerating pump actuating rod to start an action for automatic speeding or reduction; by means of the stable rotation of said servo motor to let the action of speeding up, slowing down, or constant speed performance be stably controlled.

DETAILED DESCRIPTION OF THE PREFERRED EMBODIMENTS

Figure 1:
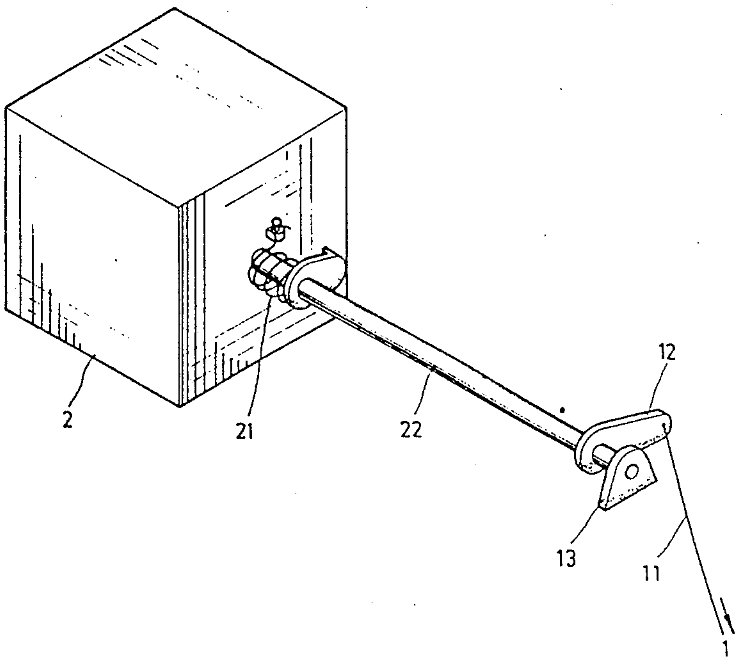
FIG. 1 is a perspective view of conventional speeder system in regular cars.
Figure 2:
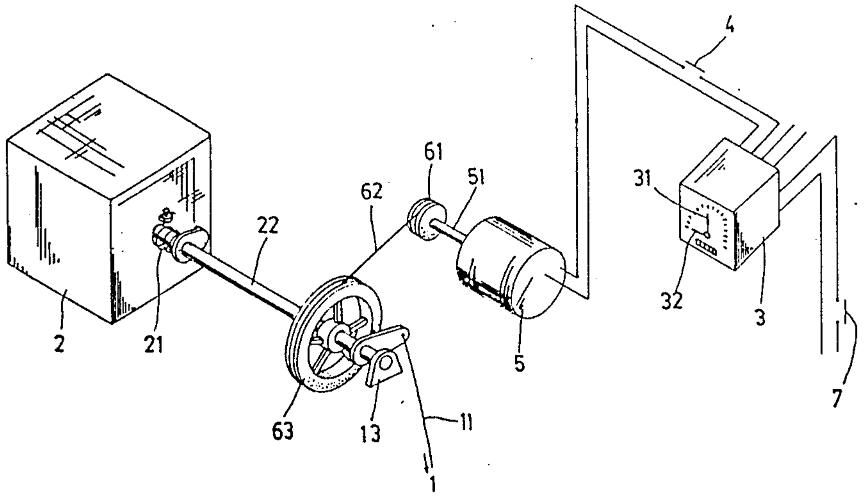
FIG. 2 is a perspective view of an automatic speeder system embodying the present invention.
Figure 3:
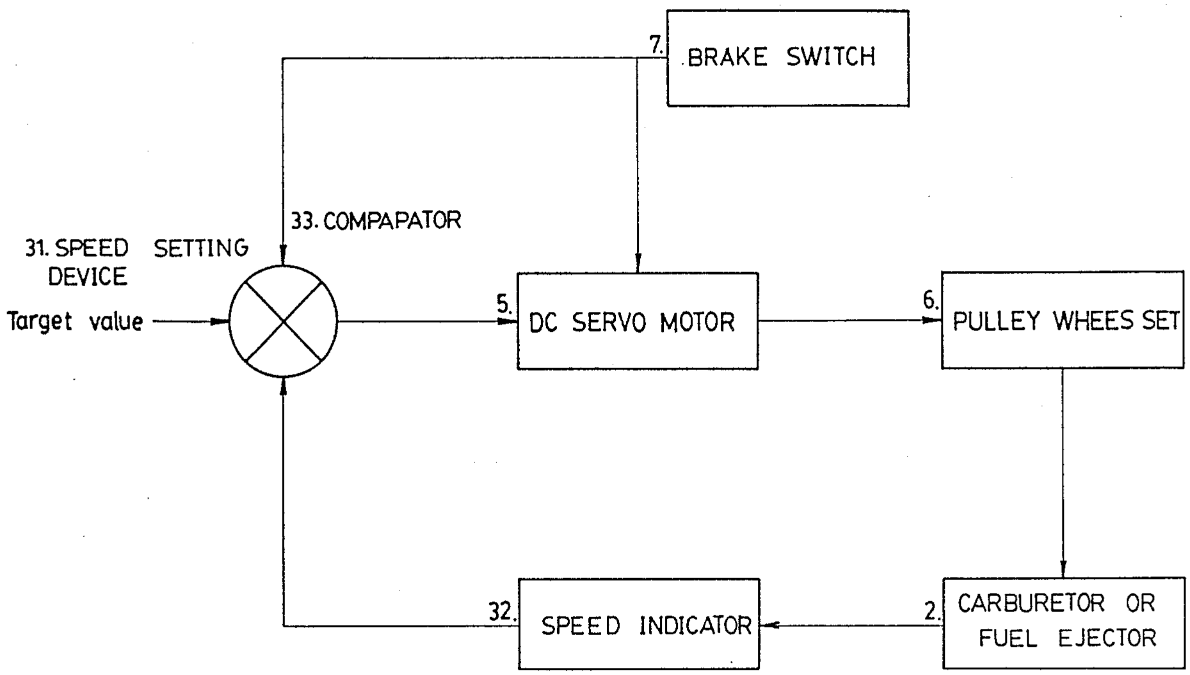
FIG. 3 is a block diagram for the automatic speeder system according to the present invention.

Please refer to the perspective view of the present automatic speeder system as shown in FIG. 2. Wherein one pair of terminals of the speed controller (3) are connected to power cource through brake switch (7), another pair of terminals are connected to servo motor (5) through control switch (4), the small pulley wheel (61) is fixedly attached to the motor shaft (51) and connected with a large pulley wheel (63) by means of driving cable (62), the large pulley wheel (63) is fixedly attached to the actuating rod (22) of the accelerating pump.

please refer to the block diagram for the automatic speeder system according to the present invention as shown in FIG. 3 wherein speed setting device (31) provides the comparator (33) with a target value, the speed indicator (32) feeds back a signal to the comparator (33) for comparison, after making a comparison the comparator (33) sends the compared value to the DC servo motor (5) to drive pulley wheels set (6) and carburetor or fuel ejector (2) so as to accelerate the car; in the diagram, there is a brake switch (5) to control servo motor (5) and comparator (33), when brake switch (5) is turned on it forces servo motor (5) to make a reverse rotation to decelerate the speed and drives comparator (33) to stop working.

For better understanding, the motion of the present invention is as described hereinafter:

A-1 Automatic·Accelerating (applicable for automatic transmission cars)

When the car is started, allocate the automatic shifter to D or R position and adjust the speed setting device (31) of the speed controller to a target value (speed) and turn on the control switch (4), thus, the speed setting device (31) provides the comparator (33) with the target value to let the comparator (33) send the signal to the servo motor (5) for making a clockwise rotation, therefore, the motor, by means of driving shaft, makes the small pulley wheel (61) to drive the driving cable (62) and the large pulley wheel (63), and the actuating rod (22) of the accelerating pump is thus turned round by the large pulley wheel (22) to speed up the car. During the motion above described, the speed indicator (32) continuously feeds back existing speed signal to the comparator (33) for comparison with the target value; if the compared value is below 0, the comparator (33) keeps providing signal to the servo motor (5) for clockwise rotation to continuously accelerate the speed; if the compared value equals to 0, the comparator (33) immediately provides the servo motor (5) with a signal to stop rotating so as to let the car run forward under a constant speed.

A-2 Automatic Accelerating (applicable for non-automatic transmission cars)

When the car is started, adjust the shifter from low speed to high speed shift, as soon as the shifter is adjusted to the maximum speed shift adjust the speed setting device (31) of the speed controller (3) according to the target value (speed) and turn on the control switch (4), the speed setting device (31) thereby sends the target value to the comparator (33) and the comparator (33) transmit the signal obtained to the servo motor (5) for making a clockwise rotation, by means of the driving shaft (51), the servo motor (5) turns the small pulley wheel (61) to drive the driving cable (62) and the large pulley wheel (63), therefore, the large pulley wheel (63) drives the actuating rod (22) of the accelerating pump to speed up the car; during the notion above described, the speed indicator (32) keeps sending existing speed signal to the comparator (33) and the comparator (33) continuously compare the fed back signal with the target value, when the compared value is below 0 the comparator (33) keeps sending signal to the servo motor (5) to rotate clockwise and to accelerate the car continuously; if the compared value equals to 0, the comparator (33) thereby provides a signal to the servo motor (5) to stop rotating so as to let the car run forward under a constant speed.

B. Automatic decelerating

When the car speed exceeds by the target value of the speed setting device (31), the compared value, made by the comparator between the target value of the speed setting device (31) and the fed back value from the speed indicator (32), is over 0, and the comparator (33) sends the signal to the servo motor (5) for making a counter rotation, and the actuating rod (22) of the accelerating pump is turned to make a reverse rotation by means of the inertia effect of the return spring (21) so as to let the car decelerate the speed.

C. Braking

When the driver steps on the brake pedal, the brake switch (7) is then turned on to send the signal to the comparator (33) and to stop the comparator (33), the signal is simultaneously transmitted to the servo motor (5) to force the servo motor (5) to make a reverse rotation so as to decelerate the speed.

I claim:

1. An automatic car speeder control comprising:

a speed controller comprising speed setting means for retaining a preset speed and generating a signal proportional thereto, speed indicator means for generating a signal proportional to the actual speed, and comparator means for comparing said signals and generating a signal proportional to the comparison;

a DC servo motor having an output shaft, a small pulley mounted on the output shaft; control means coupled between said motor and the output of said comparator means for driving said motor in a direction of rotation responsive to the comparator signal;

accelerating pump means for controlling the speed of a car having an actuator shaft, a large pulley mounted on said shaft said pulleys being coupled together in a driving relationship whereby said small pulley is the driver and the large pulley is driven by said servo motor to drive said pump means; and brake switch means coupled to the controller for selectively activating and deactivating said controller.

2. The speeder control of claim 1 wherein said control means causes said servo motor to drive its output shaft to rotate in a first direction when the comparator signal is less than zero, to stop rotating when the signal is zero and to rotate in an opposite direction when the signal is greater than zero.

3. The speeder control of claim 1 wherein said brake switch means deactivates said controller to permit decelleration.

* * * * *